(12) United States Patent
Nakanishi

(10) Patent No.: US 6,819,064 B2
(45) Date of Patent: Nov. 16, 2004

(54) DISPLAY SYSTEM

(75) Inventor: Shuichi Nakanishi, Tokyo (JP)

(73) Assignee: NEC Viewtechnology, Ltd. (JP)

( * ) Notice: Subject to any disclaimer, the term of this patent is extended or adjusted under 35 U.S.C. 154(b) by 0 days.

(21) Appl. No.: 10/336,969

(22) Filed: Jan. 6, 2003

(65) Prior Publication Data

US 2003/0128000 A1 Jul. 10, 2003

(30) Foreign Application Priority Data

Jan. 10, 2002 (JP) ......................................... 2002-003370

(51) Int. Cl.[7] ............................ H01J 29/78; G09G 3/36
(52) U.S. Cl. ....................... 315/408; 315/160; 315/378; 345/84
(58) Field of Search ................................ 315/408, 378, 315/160; 345/84, 32, 89, 147, 204, 205; 348/742, 750, 767

(56) References Cited

U.S. PATENT DOCUMENTS

| | | | | |
|---|---|---|---|---|
| 5,706,061 A | * | 1/1998 | Marshall et al. | ............. 348/743 |
| 5,774,196 A | * | 6/1998 | Marshall | ..................... 348/743 |
| 6,256,425 B1 | * | 7/2001 | Kunzman | ................... 382/274 |
| 6,453,067 B1 | * | 9/2002 | Morgan et al. | ............. 382/162 |
| 6,535,187 B1 | * | 3/2003 | Wood | ........................... 345/84 |
| 6,567,134 B1 | * | 5/2003 | Morgan | ....................... 348/743 |
| 6,672,724 B1 | * | 1/2004 | Peterson et al. | .............. 353/81 |
| 2002/0093477 A1 | * | 7/2002 | Wood | .......................... 345/89 |

FOREIGN PATENT DOCUMENTS

| JP | 9-149350 | 6/1997 |
|---|---|---|
| JP | 10-78550 | 3/1998 |

OTHER PUBLICATIONS

M.G. Robinson, et al., "9.3: High Contrast Color Splitting Architecture Using Color Polarization Filters", *SID '00 Digest*, vol. 31, Apr. 2000, pp. 92–95.

* cited by examiner

*Primary Examiner*—Don Wong
*Assistant Examiner*—Chuc Tran
(74) *Attorney, Agent, or Firm*—Ostrolenk, Faber, Gerb & Soffen, LLP

(57) ABSTRACT

A display system capable of raising limits on the response speed of the spatial light modulator and the rate of pulse-width modulation signal transfer is provided at a low cost. The display system comprises: a color switch filter unit used in the sequential color separation of white light from the light source; a spatial light modulator which is illuminated by lights of plural color elements from the color switch filter unit and generates image lights of the respective color elements; and an intensity switch filter unit for switching three or more intensity levels of the respective lights of plural color elements, being separate from the color switch filter unit.

29 Claims, 8 Drawing Sheets

F I G. 5
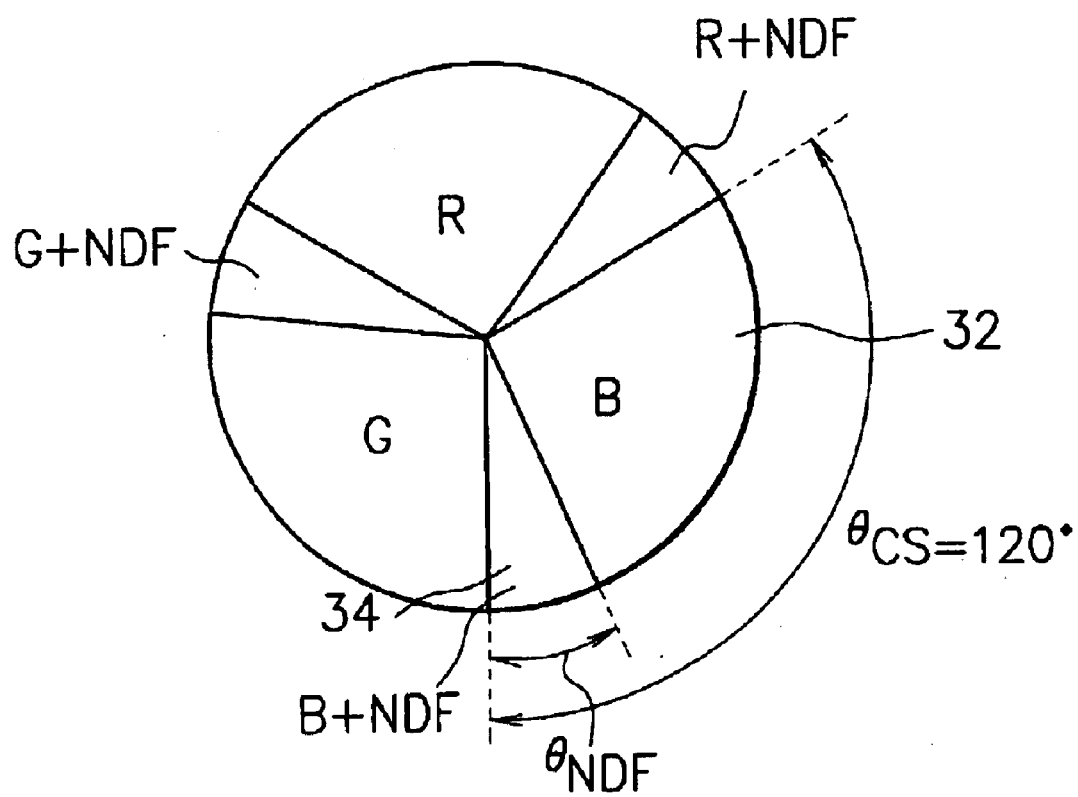

DISPLAY SYSTEM

FIELD OF THE INVENTION

The present invention relates to a display system for producing color images by light-modulating (spatially light-modulating) the lights of different color elements obtained through sequential color separation and, more particularly, to a display system which adopts a pulse-width modulation for light modulation.

BACKGROUND OF THE INVENTION

A pulse-width modulating display system is generally provided with a spatial light modulator that generates image lights by partially reflecting or transmitting light from a light source, and sequentially projects the image lights produced by the modulator on a screen to display images. The spatial light modulator generates the image lights on the basis of input image signals from external devices such as PCs and video equipment. The contrast of images displayed on the screen is normally defined by modulating the pulse-width of signals that execute ON/OFF control of the modulator.

There is described an example of the pulse-width modulating display system in Japanese Patent Application laid open No. HEI10-78550. The conventional display system obtains color images by light-modulating the lights of different color elements which have undergone sequential color separation.

FIG. 1 is a block diagram showing the configuration of the conventional display system. With reference to FIG. 1, the display system comprises a light source 1, a color switch filter unit 31 used in the sequential color separation of white light from the light source, a spatial light modulator 2 for sequentially receiving the lights of different color elements obtained by the sequential color separation and generating the image lights of the color elements by partially reflecting the input lights in a prescribed direction, a projection lens 3 for projecting the image lights of the color elements sequentially generated by the spatial light modulator 2 on a screen 4, and a drive circuit 51 for driving the spatial light modulator 2 and color switch filter unit 31 in synchronism based on an image signal 101 and a frame synchronous signal 102 sent from the outside (e.g. PC).

Examples of the spatial light modulator 2 include a digital micromirror device (DMD) comprised of hundreds of thousand of micro-mirrors whose angles of gradient are adjustable. The micro-mirrors of DMD correspond to, one each, the picture elements (pixels) of images displayed on the screen 4. Any images can be presented by controlling the angle of each micro-mirror. To be specific, each of the micro-mirrors is selectively adjusted at the first angle for reflecting the light in a direction to avert it from the projection lens 3 or the second angle for reflecting the light to the projection lens 3, thus creating desired images on the screen 4. The angle control of the micro-mirrors is executed based on a modulation signal 103 fed from the drive circuit 51.

The color switch filter unit 31 includes a color wheel 41 provided with plural color filters (Red, Green, Blue) which have different spectral transmittance characteristics and are arranged one by one in the circumferential direction, a motor 11 which supports the center of the color wheel 41 for rotating the wheel 41 in a prescribed direction, a couple of elements (light emitting element 12 and light acceptance element 13) disposed opposite to each other with the color wheel 41 between them, and a color wheel control circuit 81 for controlling the rotation of the motor 11.

The color wheel control circuit 81 receives a color wheel phase signal 112 from the light acceptance element 13 as well as a color switch control signal 104 from the drive circuit 51, and sends a motor control signal 111 to the motor 11. The color wheel phase signal 112 includes information on the rotation cycle of the color wheel 41. The information is derived from the timing of the reception of light that the light emitting element 12 emits through a hole made in a prescribed position on the color wheel 41 to the light acceptance element 13.

The image signal (video signal) 101 fed from the outside consists of image signals relative to respective colors Red, Green and Blue (including intensity information), which are sequentially output with respect to each frame. Besides, frame synchronization is performed based on the frame synchronous signal 102. The modulation signal 103 is a signal for controlling the angles of the micro-mirrors of the spatial light modulator 2 according to the image signal 101 (image signals for colors R, G and B). That is, the respective micro-mirrors are set at the first angle or the second angle based on the modulation signal 103. The color switch control signal 104 controls color filter (R, G, B) switching to execute the color separation by the color wheel 41. The color filters can be switched in timing with the changeover of the image signal 101 based on the frame synchronous signal 102. The color filter switching is carried out by rotating the color wheel 41 in a light path.

In the following, the image display operation of the above-mentioned conventional display system will be described by taking the case where the image signal (R, G, B) 101 is fed into the drive circuit 51 for example.

The light radiated from the light source 1 enters in the color switch filter unit 31. When the image signal (Red) 101 is input on this occasion, the drive circuit 51 controls the angles of the micro-mirrors corresponding to the respective pixels in response to the signal (R) 101. Concretely, the drive circuit 51 feeds the modulation signal 103 with the spatial light modulator 2 to switch the angles of the respective micro-mirrors to the first angle (at which the micro-mirror reflects light to divert it from the projection lens 3) or the second angle (at which the micro-mirror reflects light toward the projection lens 3).

In addition, the drive circuit 51 switches the color filters of the color wheel 41 in synchronism with the angle control of the micro-mirrors (spatial light modulation in the spatial light modulator 2) according to the frame synchronous signal 102. More specifically, the drive circuit 51 feeds the color wheel control circuit 81 with the color switch control signal 104 to switch the filter set in the light path to the color filter (R) when the image signal (R) 101 is input. The color wheel control circuit 81 sends the motor control signal 111 to the motor 11 based on the color switch control signal 104 and the color wheel phase signal 112 received from the light acceptance element 13. In response to the motor control signal 111, the motor 11 rotates the color wheel 41 so that the light radiated from the light source 1 enters the color filter (R).

The light having entered the color filter (R) transmits therethrough and becomes light (R). The light (R) then enters into the spatial light modulator 2. The light modulator 2 spatially light-modulates the light (R) to generate image light (R). The image light (R) is projected on the screen 4 by the projection lens 3.

Subsequently, the image signal (Green) 101 is input. With this the drive circuit 51 feeds the spatial light modulator 2 with the modulation signal 103 to execute the angle control of the micro-mirrors according to the image signal (G) 101. At the same time, the drive circuit 51 feeds the color wheel control circuit 81 with the color switch control signal 104 to switch the filter of the color wheel 41 to the color filter (G). The color wheel control circuit 81 sends the motor control signal 111 to the motor 11 based on the color switch control signal 104 and the color wheel phase signal 112 received from the light acceptance element 13. In response to the motor control signal 111, the motor 11 rotates the color wheel 41 so that the light radiated from the light source 1 enters the color filter (G).

The light having entered the color filter (G) transmits therethrough to become light (G). The light (G) then enters into the spatial light modulator 2. The spatial light modulator 2 spatially light-modulates the light (G) to generate image light (G). The image light (G) is projected on the screen 4 by the projection lens 3.

After that, the image signal (Blue) 101 is input. Accordingly, the drive circuit 51 feeds the spatial light modulator 2 with the modulation signal 103 to execute the angle control of the micro-mirrors in conformity with the image signal (B) 101. At the same time, the drive circuit 51 feeds the color wheel control circuit 81 with the color switch control signal 104 to switch the filter of the color wheel 41 to the color filter (B). The color wheel control circuit 81 sends the motor control signal 111 to the motor 11 based on the color switch control signal 104 and the color wheel phase signal 112 received from the light acceptance element 13. In response to the motor control signal 111, the motor 11 rotates the color wheel 41 so that the light radiated from the light source 1 enters the color filter (B).

The light having entered the color filter (B) transmits therethrough to become light (B). The light (B) then enters into the spatial light modulator 2. The spatial light modulator 2 spatially light-modulates the light (B) to generate image light (B). The image light (B) is projected on the screen 4 by the projection lens 3.

As a result of these operations, the image lights R, G and B are sequentially projected to an enlarged scale on the screen 4. The switch in the image lights (R, G, B) is inappreciable to the human eye. Consequently, images in the respective colors shown by the image lights (R, G, B) are temporally superimposed, and thus recognized as a color image in human perception. The contrast of color images displayed on the screen 4 can be arbitrarily adjusted by modulating the pulse-width of the modulation signal 103 that controls the operation of the spatial light modulator 2.

In the following, a description will be given of the concrete configuration of the drive circuit 51 and color wheel control circuit 81 of the conventional display system.

FIG. 2 is a block diagram showing an example of the configuration of the color wheel control circuit 81. The color wheel control circuit 81 receives the color switch control signal 104 from the drive circuit 51 and the color wheel phase signal 112 from the light acceptance element 13 as its input signals. The color wheel control circuit 81 includes a frequency phase comparator 83 for comparing the frequency phases of the input signals to output an error signal, and an amplifier 84 for amplifying the error signal output from the frequency phase comparator 83 to output the amplified signal as the motor control signal 111.

FIG. 3 is a block diagram showing an example of the configuration of the drive circuit 51. The drive circuit 51 has a pulse-width modulating circuit and a color switch control circuit 68. The pulse-width modulating circuit is composed of a memory circuit 61, a write control circuit 63, read control circuit 64 and a color switch timing information table 65.

The color switch timing information table 65 includes the information indicating the timing for making a switch in color filters of the color wheel 41. The color switch control circuit 68 outputs the color switch control signal 104 in synchronism with the frame synchronous signal 102 for switching colors in the color switch filter unit 31 shown in FIG. 1.

The image signal 101 input from the outside is once written into the memory circuit 61. Necessary data is read out of the memory circuit 61, and sent to the spatial light modulator 2 as the modulation signal 103. The write control circuit 63 controls the operation of writing the image signal 101 into the memory circuit 61. The timing of the writing operation is determined based on the frame synchronous signal 102. The read control circuit 64 controls the operation of reading necessary data out of the memory circuit 61. The timing of the reading operation is determined based on the color switch timing in the color wheel 41 derived from the frame synchronous signal 102 and the color switch timing information table 65.

In the above-described conventional display system, the spatial light modulator 2 controls the switch between ON/OFF states on a pixel-by-pixel basis according to the modulation signal 103. The light is conducted to the projection lens 3 in the ON state, whereas the light is not conducted thereto in the OFF state. The produced image becomes brighter as the ON state continues longer. In the pulse-width modulation, the image signal indicates the contrast by taking advantage of this behavior. Examples of the spatial light modulator 2 capable of such pulse-width modulation include surface stabilized ferroelectric liquid crystal displays, etc. in addition to DMD.

The pulse-width modulation will be more fully described below.

It is assumed by way of example that 8 bits are used to define the contrast of respective R, G and B colors in the input image signal 101. FIG. 4 is a schematic diagram showing the per frame data structure of the image signal 101 for explaining the pulse-width modulation in the conventional display system.

One frame of the image signal 101 is time-divided into sections for data R, G and B. The respective data R, G and B is composed of time slots 1 to 255. Time slot 255 is allocated to bit 0, and correspondingly, other time slots are allocated to the respective bits as follows: time slots 254 and 253 for bit 1, time slots 252 to 249 for bit 2, time slots 248 to 241 for bit 3, time slots 240 to 225 for bit 4, time slots 224 to 193 for bit 5, time slots 192 to 129 for bit 6, and time slots 128 to 1 for bit 7.

Time (time slots) is allocated to the respective bit 7 (most significant bit: MSB), bit 6, . . . , bit 1, bit 0 (least significant bit: LSB) in a ratio of $2^7:2^6: \ldots :2^1:2^0$. Provided that time T is allocated to bit 0, times 128T, 64T, . . . , 4T, 2T are allocated for bit 7, bit 6, . . . , bit 2, bit 1, respectively. Besides, when the input image signal 101 indicates the contrast levels of 255, 254, . . . , 2, 1, and 0, the periods of ON state corresponding to the respective contrast levels are 255T, 254T, . . . , 2T, T, and 0.

Bit assignment information indicates the above-mentioned time allocation for each bit, and is normally prepared beforehand in the form of a bit assignment information table. The ON/OFF control of the spatial light modulator 2 is carried out according to the bit assignment information table. For example, in the case of representing a contrast level of 130 for a pixel, the spatial light modulator 2 controls the light in regard to the pixel so that the light reaches onto the screen during the time-domains of the bit 7 (128 unit time) and bit 1 (2 unit time), but does not reach thereto in the time-domains of other bits 6 to 2.

However, the conventional display system has the following problems.

Let it be assumed that, in cases, as for example, where the sequential color separation of white light is performed with the use of a color wheel having filters in three colors R, G and B, the color wheel rotates at a speed of 60 Hz and 8 bits are used to define the contrast of the respective colors. In this case, the minimum switching time in the pulse-width modulation is below 22 microseconds. It is necessary to use a spatial light modulator having response speed faster than the minimum switching time. In addition, the minimum switching time becomes even shorter when increasing the rotational speed or number of colors of the color wheel, or raising the level of contrast. As a result, higher response speed is required of the spatial light modulator. Nevertheless, there is a limit to the response speed of the modulator. Consequently, the minimum switching time in the pulse-width modulation has been limited due to the response speed of the modulator, and it has been difficult to increase the number of bits beyond a certain level. Incidentally, when the setting of the minimum switching time exceeds the response speed of the modulator, the brightness of images displayed by LSB is lowered, resulting in a deterioration of image quality in areas of low brightness.

Besides, provided that the spatial light modulator supports 1024×768 pixels, the maximum rate of pulse-width modulation signal transfer to the modulator is very high, up to 564 MHz per 64-bit width (=60 Hz*3*255*1024*768/64). Since higher signal frequency produces a higher level of noise, peripheral circuits become susceptible to malfunction, and further, power consumption increases.

Consequently, there have been made studies on a display system with low rate of pulse-width modulation signal transfer, in which a spatial light modulator having low response speed is usable while maintaining system's performance. In the following, a description will be given of the display system described in Japanese Patent Application laid open No. HEI9-149350 as an example.

FIG. 5 is a schematic diagram of a color wheel used in the above-mentioned system. The color wheel is provided with a plurality of color filters (R, G, B) having different spectral transmittance characteristics, which are arranged one by one in the circumferential direction at a prescribed rate (spacing angle: 120°). The filter B is provided with a low-density segment 34 or a density (intensity) filter B+NDF in a certain angular range from the interface with the filter G. White light transmittance is decreased in the low-density segment 34 as compared to the other areas 32 of the filter B. The filters R and G are likewise provided with low-density segments R+NDF and G+NDF, respectively.

In the system, white light from the light source is sequentially separated into color lights R, G and B by rotating the color wheel in a light path. After that, the color lights illuminate DMD being the spatial light modulator, and image lights R, G and B from the DMD are sequentially superimposed on the screen. Thus, color images are produced in the same manner as the system depicted in FIG. 1. Since the respective color filters R, G and B of the color wheel are provided with the low-density segments, the intensity of the color lights R, G and B drops in the segments. Consequently, when the ON/OFF switch of light in the time-domains of low bits of an image signal, namely, bit 1 (2 unit time) is carried out for the lights having passed through the low-density segments, it becomes possible to extend the time for the low bits. The response speed of the DMD is regulated by the length of time of the low bits. Therefore, it also becomes possible to reduce the response speed according to the extension of the time for the low bits However, there are following problems in the above-described conventional display systems.

In the display system depicted in FIG. 1, there is a limit to the rate of pulse-width modulation signal transfer as well as to the response speed of the available spatial light modulator, which necessarily causes a disadvantage in design.

On the other hand, in the display system having the color wheel of FIG. 5, the problem of the limit is resolved. However, there are produced new problems as follows.

It is preferable to use the intensity filter also for intermediate bits between high bits and low bits in order to smoothly present the contrast. In other words, it is necessary to provide the respective color filters with plural intensity filters of different degrees of intensity to achieve a good contrast presentation. The color wheel of the system has only one intensity filter with respect to each color filter, and it is difficult to achieve a good contrast presentation.

It is possible, but costly, to provide the respective color filters with plural intensity filters of different levels of intensity because the processes for manufacturing the color wheel are increased. This problem will be explained below.

The color wheel is generally produced by affixing color filters onto a transparent disk, or by depositing filter material on the surface of a transparent disk in a vacuum chamber. In the color wheel shown in FIG. 5, the respective three color filters are provided with two segments of different density levels, and 3×2=6 filters are needed. Consequently, it is required to repeat the affixing process or depositing process six times. When forming three segments of different density levels in the respective color filters, 3×3=9 filters are needed, thereby requiring nine times of the affixing process or depositing process. As is described above, when producing the color wheel with a disk, the manufacturing process is necessarily repeated {(the number of color filters)×(the number of segments formed for each filter)} times. Thus, setting of plural intensity filters of different density levels in the color wheel increases manufacturing processes and costs.

In addition, when setting plural patterns of intensity to be switched, it is required to produce the color wheel having filters corresponding to the intensity patterns if color separation and intensity switching are performed by using the same color wheel. This enormously raises the cost of production.

SUMMARY OF THE INVENTION

It is therefore an object of the present invention to provide a display system capable of raising limits on the response speed of the spatial light modulator and the rate of pulse-width modulation signal transfer at a low cost.

In accordance with an aspect of the present invention, to achieve the above objects, there is provided a display system comprising: a color switch means for switching lights of plural color elements to provide the respective lights of color elements one by one in sequence; a spatial light modulation means which is illuminated by the lights of plural color elements from the color switch means and generates image lights of the respective color elements; and an intensity switch means for switching two or more intensity levels of the respective lights of plural color elements or the respective image lights of the color elements, being separate from the color switch means.

In the display system of the present invention, the spatial light modulator generates the image lights based on an image signal input from the outside. The intensity switch means switches the intensity level of the respective lights. Accordingly, it becomes possible to allocate the high bits of the image signal for a pulse-width modulation signal in timing with brighter intensity filters, and to allocate the low bits thereof for the pulse-width modulation signal in timing with darker intensity filters. As a result, the minimum switching time of pulse-width modulation can be prolonged, thus enabling a reduction in the rate of pulse-width modulation signal transfer as well as the use of a spatial light modulator with low response speed.

Besides, the color switch means and the intensity switch means are individually provided to the display system, and therefore, color switching performed by the color switch means and intensity switching performed by the intensity switch means are controlled separately. That is, the color switching is carried out by using a color wheel. The intensity switching is carried out by using an intensity wheel being independent of the color wheel. Consequently, according to the present invention, it is possible to use the intensity wheel with plural different intensity levels for one color wheel. Thus, when setting plural patterns or levels of intensity to be switched, it is only required to produce the intensity wheel having filters corresponding to the intensity patterns, thereby dispensing with the need to produce the color wheel for each intensity pattern.

In addition, the separate color wheel and intensity wheel lead to a reduction in manufacturing process. In the case of, for example, providing the respective three color filters with segments of three different density levels, 3×3=9 filters are needed for the color wheel shown in FIG. 5 as described above. Consequently, it is required to repeat the affixing process or depositing process nine times. On the other hand, in the display system according to the present invention, three affixing processes or depositing processes are required for manufacturing the respective color wheel and intensity wheel. That is, the affixing process or depositing process is repeated six times, lessened by three times as compared to the conventional display system. The gap in the number of manufacturing processes widens as the segments of different density levels increase.

Incidentally, the intensity switching may be carried out by a liquid crystal panel, by changing the brightness of a light source, or by changing the aperture of a projection lens. Besides, a light source emitting lights in plural different colors may be adopted as the color switch means. In this case, it is possible to dispense with the color wheel and intensity wheel, and there is no need to perform complicated synchronous control.

BRIEF DESCRIPTION OF THE DRAWINGS

The objects and features of the present invention will become more apparent from the consideration of the following detailed description taken in conjunction with the accompanying drawings in which:

FIG. 5 is a schematic diagram of a color wheel used in the display system disclosed in Japanese Patent Application laid open No. HEI9-149350;

DESCRIPTION OF THE PREFERRED EMBODIMENTS

Figure 1:
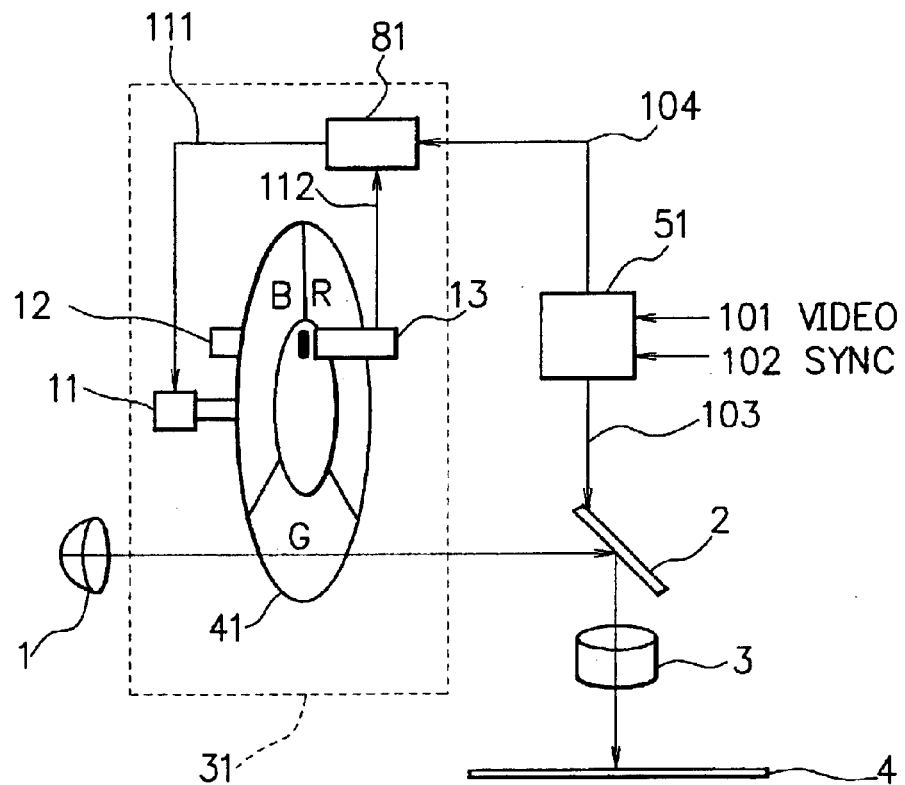
FIG. 1 is a schematic block diagram showing the configuration of the pulse-width modulating display system disclosed in Japanese Patent Application laid open No. HEI10-78550.
Figure 2:
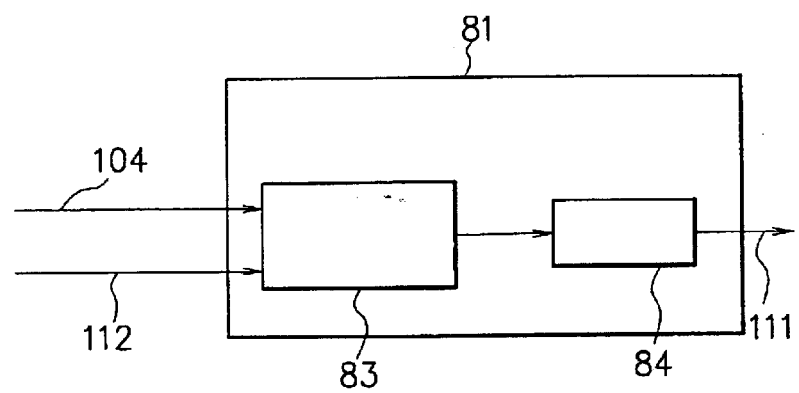
FIG. 2 is a block diagram showing an example configuration of a color wheel control circuit of the display system depicted in FIG. 1.

Referring now to the drawings, a description of a preferred embodiment of the present invention will be given in detail.

Figure 6:
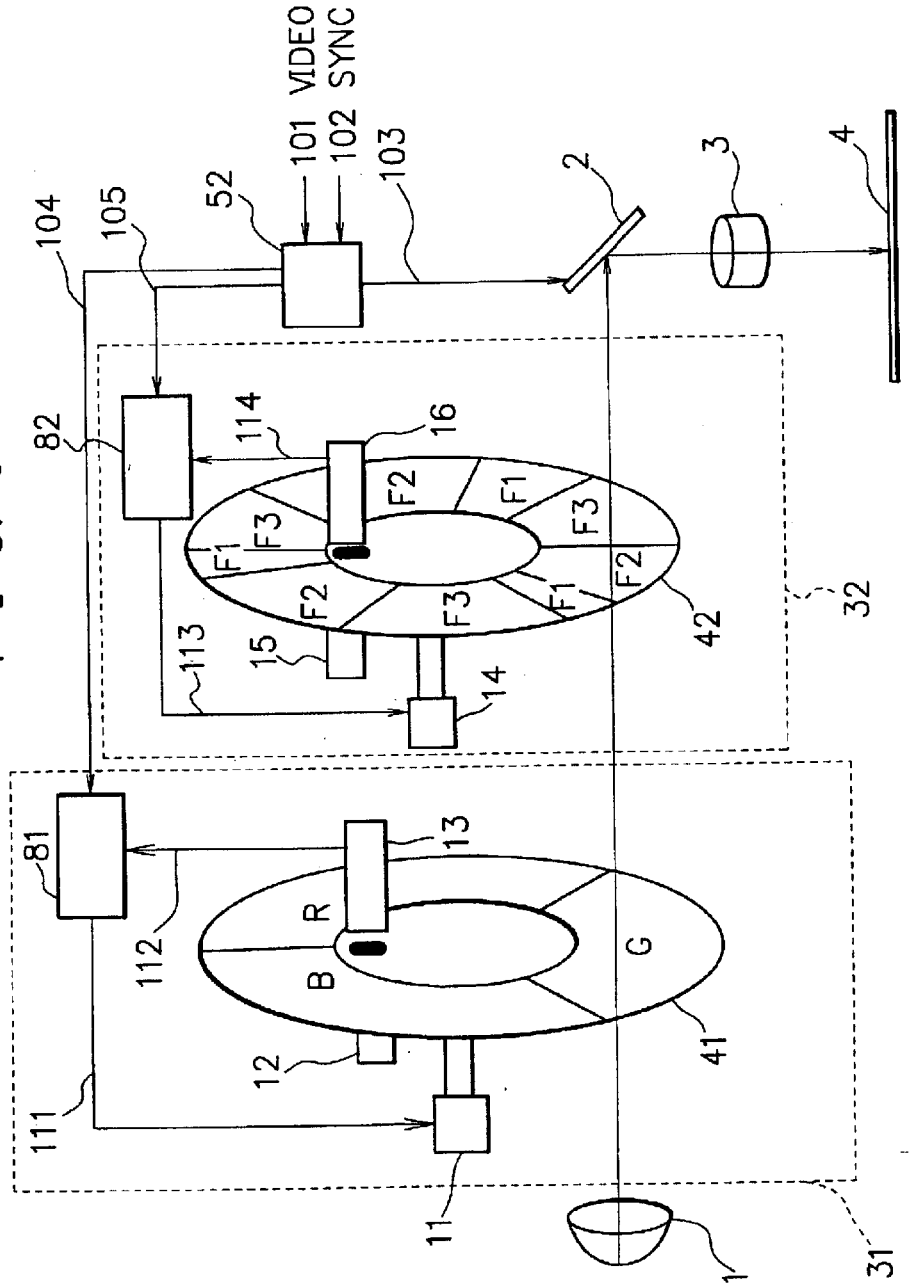
FIG. 6 is a block diagram showing the configuration of a display system according to an embodiment of the present invention.

FIG. 6 is a block diagram showing the configuration of a display system according to an embodiment of the present invention. The display system of this embodiment is similar to that shown in FIG. 1 except for the presence of intensity switch filter unit 32 and drive circuit 52 as a substitute for the drive circuit 51. Like reference characters indicate like parts in FIGS. 1 and 6, and the detailed description will not be given of these parts.

The drive circuit 52 receives the image signal 101 and frame synchronous signal 102, and sends the modulation signal 103 to the spatial light modulator 2. In addition, the drive circuit 52 feeds the intensity switch filter unit 32 with an intensity switch control signal 105 as well as feeding the color switch filter unit 31 with the color switch control signal 104.

The intensity switch filter unit 32 adjusts the brightness of the lights having transmitted through the color wheel 41 in the color switch filter unit 31. The intensity switch filter unit 32 includes a intensity wheel 42, a motor 14 which supports the center of the intensity wheel 42 for rotating the wheel 42 in a prescribed direction, a couple of elements (light emitting element 15 and light acceptance element 16) disposed opposite to each other with the intensity wheel 42 between them, and a intensity wheel control circuit 82 for controlling the rotation of the motor 14.

The intensity wheel 42 is arranged opposite to the color wheel 41. The intensity wheel 42 has the first, second and third segments corresponding to the color filters R, G and B of the color wheel 41, respectively. In each segment, a plurality of filters (NDF) F1 to F3 of different photo transmittances are arranged one by one in the circumferential direction at a prescribed rate (area ratio). The intensity wheel control circuit 82 receives an intensity wheel phase signal 114 from the light acceptance element 16 as well as an intensity switch control signal 105 from the drive circuit 51, and sends a motor control signal 113 to the motor 14.

The intensity wheel phase signal 114 includes information on the rotation cycle of the intensity wheel 42. The information is derived from the timing of the reception of light that the light emitting element 15 emits through a hole made in a prescribed position on the intensity wheel 42 to the light acceptance element 16. The intensity switch control signal 105 controls the switch operation for the filters F1 to F3 of the intensity wheel 42. The filters (NDF) can be switched in accordance with the respective bits for each color (R, G, B) of the image signal 101. The filter (NDF) switching is carried out by rotating the intensity wheel 42 in a light path.

In the construction of the display system of this embodiment, the light emitted from the light source 1 travels through the color wheel 41 in the color switch filter unit 31 and the intensity wheel 42 in the intensity switch filter unit 32 to the spatial light modulator 2. The spatial light modulator 2 modulates the incident light based on the modulation signal 103 received from the drive circuit 52 to generate visualized light (image light). The projection lens 3 extends and projects the image light generated by the spatial light modulator 2 on the screen 4.

Images in three colors R, G and B are sequentially displayed on the screen 4 by the extended projection of the image lights (R, G, B). The images are superimposed and perceived as a color image to the human eye due to an after-image effect. The contrast of the color image displayed on the screen 4 can be adjusted by the intensity wheel 42's intensity switch as well as by modulating the pulse-width of the modulation signal 103 that controls the operation of the spatial light modulator 2.

In the following, a description will be given of the concrete configuration of the drive circuit 52 and intensity wheel control circuit 82 of the display system.

Figure 7:
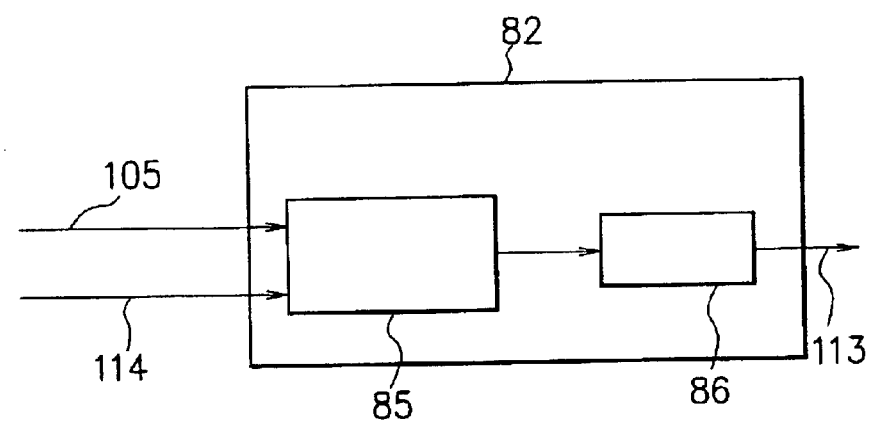
FIG. 7 is a block diagram showing an example configuration of a color wheel control circuit of the display system depicted in FIG. 6.

FIG. 7 is a block diagram showing an example of the configuration of the intensity wheel control circuit 82. The intensity wheel control circuit 82 receives the intensity switch control signal 105 from the drive circuit 52 and the intensity wheel phase signal 114 from the light acceptance element 16 as its input signals. The intensity wheel control circuit 82 includes a frequency phase comparator 85 for comparing the frequency phases of the input signals to output an error signal, and an amplifier 86 for amplifying the error signal output from the frequency phase comparator 85 to output the amplified signal as the motor control signal 113.

The motor 14 is controlled on the basis of the motor control signal 113 sent from the intensity wheel control circuit 82. Thus, the intensity wheel 42 rotates in synchronism with the frame synchronous signal 102 to switch intensity levels.

Figure 3:
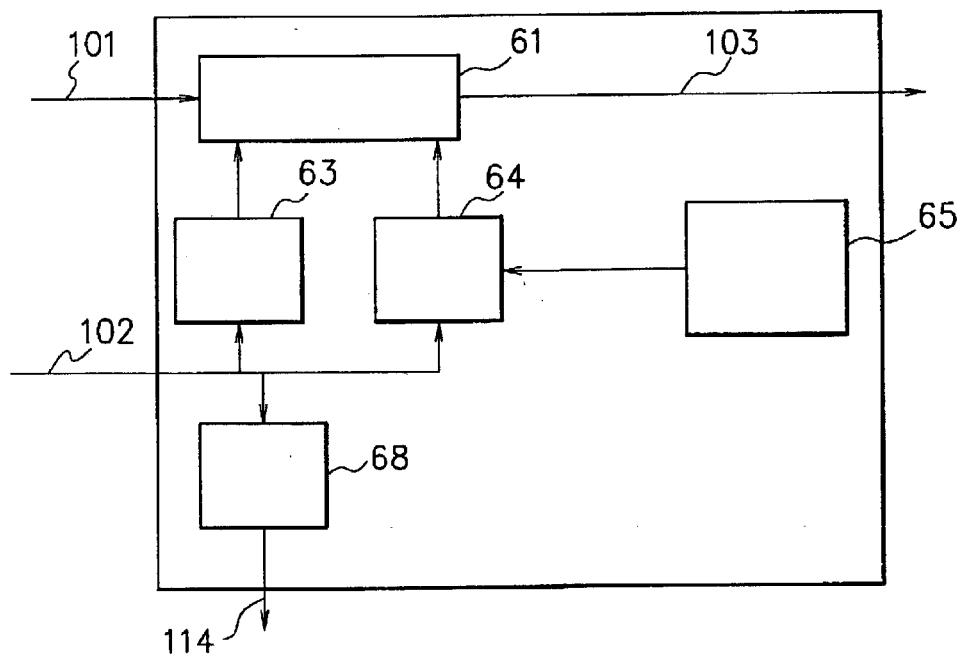
FIG. 3 is a block diagram showing an example configuration of a drive circuit of the display system depicted in FIG. 1.
Figure 8:
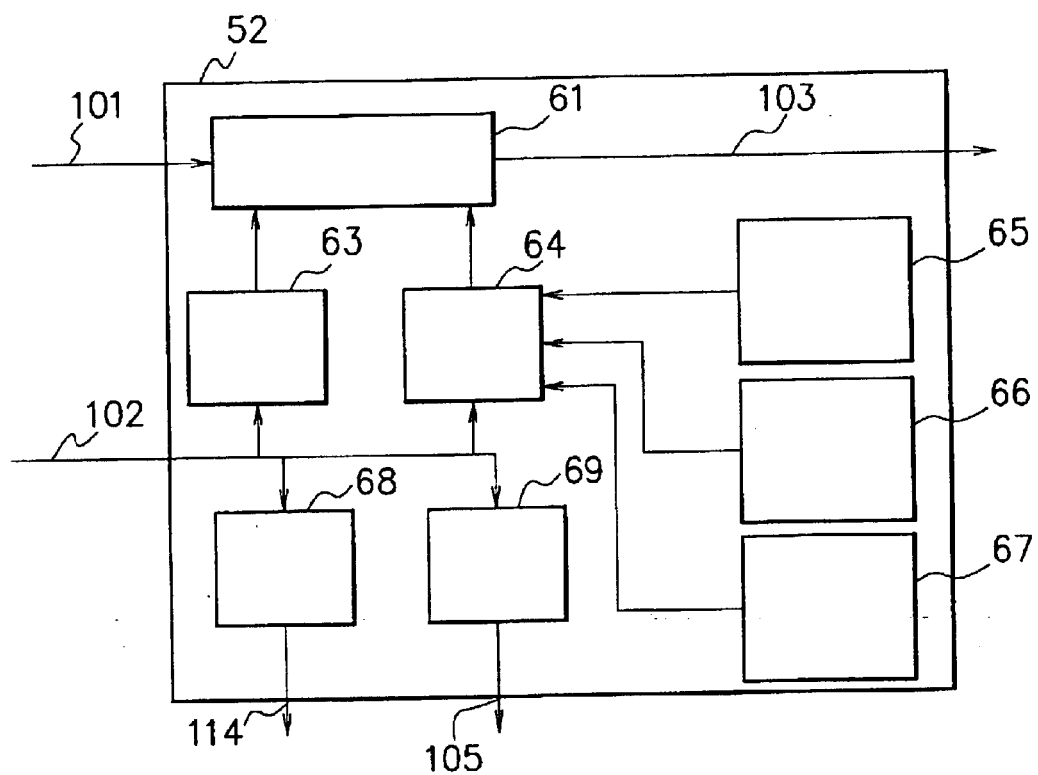
FIG. 8 is a block diagram showing an example configuration of a drive circuit of the display system depicted in FIG. 6.

FIG. 8 is a block diagram showing an example of the configuration of the drive circuit 52. The drive circuit 51 has an intensity switch timing information table 66, a bit allocation information table 67 and a intensity switch control circuit 69 in addition to the configuration of the drive circuit 51 shown in FIG. 3. Like reference characters indicate like parts in FIGS. 3 and 8. In this embodiment, the pulse-width modulating circuit is composed of the memory circuit 61, write control circuit 63, read control circuit 64, color switch timing information table 65, intensity switch timing information table 66, and bit allocation information table 67.

The color switch timing information table 65 includes the information indicating the timing for making a switch in color filters of the color wheel 41 on the basis of the frame synchronous signal 102. The intensity switch timing information table 66 contains the information indicating the timing for making a switch in intensity levels of the intensity wheel 42 on the basis of the frame synchronous signal 102. The bit allocation information table 67 contains the information on when and which of the bits of the image signal 101 for indicating the contrast is read out of the memory circuit 61 on the basis of the frame synchronous signal 102. The intensity switch control circuit 69 outputs the intensity switch control signal 105 in synchronism with the frame synchronous signal 102 for switching the intensity filters F1 to F3 in the intensity switch filter unit 32.

In this construction of the drive circuit 52, the write control circuit 63 is adjusted in timing based on the frame synchronous signal 102, and the image signal 101 is written into the memory circuit 61 according to the control by the circuit 63. Besides, the read control circuit 64 is adjusted in timing based on the frame synchronous signal 102, and necessary data is read out of the memory circuit 61 by the circuit 64. The data is sent to the spatial light modulator 2 as the modulation signal 103. The read control circuit 64 controls the operation of reading necessary data out of the memory circuit 61. The reading operation is performed based on color switch timing, intensity switch timing and contrast indicating bit read timing derived from the color switch timing information table 65, intensity switch timing information table 66, and bit allocation information table 67, respectively.

Next, a concrete description will be given of the operation of the display system according to this embodiment. In the following description, the contrast is indicated by k bits of the image signal 101, the number of colors switched by the color switch filter unit 31 is m, and the number of intensity levels switched by the intensity switch filter unit 32 is n ($n \geq 2$).

Additionally, m color filters in the color switch filter unit 31 are represented as E1, E2, . . . , Em, and n levels of intensity filters in the intensity switch filter unit 32 are represented as F1, F2, . . . , Fn in ascending order of intensity level of outgoing light therefrom. The intensity ratio of the outgoing lights from the intensity filters F1, F2, . . . , Fn stands at:

F1:F2: . . . :Fn=S1:S2: . . . :Sn in which S1=1. In pulse-width modulation, allocated time per frame time for bit h of the image signal 101, color filter Ei and intensity filter Fj is T(h, i, j), where:

$0 \leq h \leq k-1$ $1 \leq i \leq m$ $1 \leq j \leq n$

T(0, i, 1)=T0.

In the display system of this example, the condition of the following expression is satisfied.

$$(S1*T(h, i, 1)+S2*T(h, i, 2)+ \ldots +Sn*T(h, i, n))/T0=\text{pow}(2, h) \quad (1)$$

In the expression, pow(2, h) indicates 2 to the power of h ($2^h$), and * indicates multiplication, namely, the same as "×". Expression (1) presents the condition for defining the contrast of images or the image signal 101 by the pulse-width modulation in the case of making a switch in plural intensity levels.

Provided that display time per frame time when color filter Ei is paired with intensity filter Fj is Tc(i, j):

$$Tc(i, j)=T(0, i, j)+T(1, i, j)+ \ldots +T(k-1, i, j) \quad (2)$$

Expression (2) presents the condition for deciding the switching time of the intensity filters.

Besides, in the display system of this example, the condition of the following expression is satisfied.

$$(Tc(i, 1)+Tc(i, 2)+ \ldots +Tc(i, n))/T0 = (\text{pow}(2, k)-1) \quad (3)$$

Expression (3) presents the condition for extending the minimum unit time in the pulse-width modulation as compared to the conventional display system.

The intensity switch timing information table 66 depicted in FIG. 8 contains the information of Tc(i, j) conditioned on the above expressions (1) to (3). The read control circuit 64 uses the information for its control operation. The bit allocation information table 67 contains the information of T(h, i, j) conditioned on the above expressions (1) to (3). The information is also used for the control operation of the read control circuit 64.

In the following, it will be explained that there are always variable values which satisfies the above expressions (1) to (3).

Concerning a certain color of colors sequentially separated by the color switch filter unit 31, expression (1) is established with respect to k pieces of h, and expression (2) is established with respect to n pieces of j. Consequently, (k+n) conditional expressions are established based on expressions (1) and (2). On the other hand, there are n in number of Sj, (k*n) in number of T(h, i, j)/T0, and k in number of h. Thus, the total number of variable values is (n+(k*n)+k). When the number of contrast bits of the image signal 101 and the number of the intensity filters are determined, one conditional expression is established according to expression (3). That is, the number of independent variables is (k*n), and at least 2. Therefore, there are always variable values which meet expressions (1) to (3).

In the aforementioned conditions, the intensity levels of the outgoing lights from the respective intensity filters may have the ratio of 2 to the power of any integer, and also any bit of the image signal 101 may be allocated for only one intensity filter. The conditions are expressed as following expressions (4) and (5) by using integers j1, j2, Xj1 and Xj2 which satisfy:

$$j1+1=j2$$

$$1<=j1<j2<=n$$

$$0<=Xj1<Xj2<=k-1.$$

$$\left. \begin{array}{l} Sj1 = \text{pow}(2, Xj1) \\ Sj2 = \text{pow}(2, Xj2) \end{array} \right\} \quad (4)$$

$$\left. \begin{array}{l} \text{When } h < Xj1, T(h, i, j1)/T0 = 0. \\ \text{When } Xj1 <= h < Xj2, T(h, i, j1)/T0 = \text{pow}(2, h-Xj1). \\ \text{When } Xj2 <= h, T(h, i, j1)/T0 = 0. \\ \text{When } Xj2 = h, T(h, i, j2)/T0 = 1. \end{array} \right\} \quad (5)$$

It is easily understood that expression (1) is satisfied on the conditions according to expressions (4) and (5).

Next, it will be explained that expression (3) is satisfied on these conditions with respect to k (k: an integer larger than 1).

Assuming that the number of contrast bits of the image signal 101 is k and the number of the intensity filters is n, the left side of inequality (3) comes out by using expression (2) as follows:

$$(Tc(i, 1)+Tc(i, 2)+ \ldots +Tc(i, n))/T0 = (\text{pow}(2, k1)-1)+(\text{pow}(2, k2)-1)+ \ldots +(\text{pow}(2, kn)-1) \quad (6)$$

Incidentally, k1, k2, ..., kn are positive integers which satisfy k1+k2+ ... kn=k.

The combination of n, k1, k2, ..., kn for obtaining a maximum value in expression (6) is:

$$n=2, k1=1, k2=k-1,$$

In this case, the value derived from expression (6), that is, the left side of inequality (3) is pow(2, k−1), thus satisfying inequality (3) in terms of k.

A concrete example will be given with reference to FIG. 6. It is assumed by way of example that 8 bits are used to define the contrast in the image signal 101, the number of colors switched by the color switch filter unit 31 is 3, and the number of intensity levels switched by the intensity switch filter unit 32 is 3. That is, k=8, m=3, n=3.

Provided that the intensity ratio of the outgoing lights from the intensity filters F1, F2, F3 stands at:

$$S1:S2:S3=1:4:32; \text{ and}$$

$$T(0, i, 1)=1*T0, T(0, i, 2)=0*T0, T(0, i, 3)=0*T0$$

$$T(1, i, 1)=2*T0, T(1, i, 2)=0*T0, T(1, i, 3)=0*T0$$

$$T(2, i, 1)=0*T0, T(2, i, 2)=1*T0, T(2, i, 3)=0*T0$$

$$T(3, i, 1)=0*T0, T(3, i, 2)=2*T0, T(3, i, 3)=0*T0$$

$$T(4, i, 1)=0*T0, T(4, i, 2)=4*T0, T(4, i, 3)=0*T0$$

$$T(5, i, 1)=0*T0, T(5, i, 2)=0*T0, T(5, i, 3)=1*T0$$

$$T(6, i, 1)=0*T0, T(6, i, 2)=0*T0, T(6, i, 3)=2*T0$$

$$T(7, i, 1)=0*T0, T(7, i, 2)=0*T0, T(7, i, 3)=4*T0$$

the condition of expression (1) is satisfied. Besides, according to expression (2):

$$Tc(i, 1):Tc(i, 2):Tc(i, 3)=3:7:7.$$

This means that the area ratio of the intensity filters F1, F2 and F3 on the intensity wheel 42 which rotates at a constant speed is supposed to stand at 3:7:7.

Figure 9:
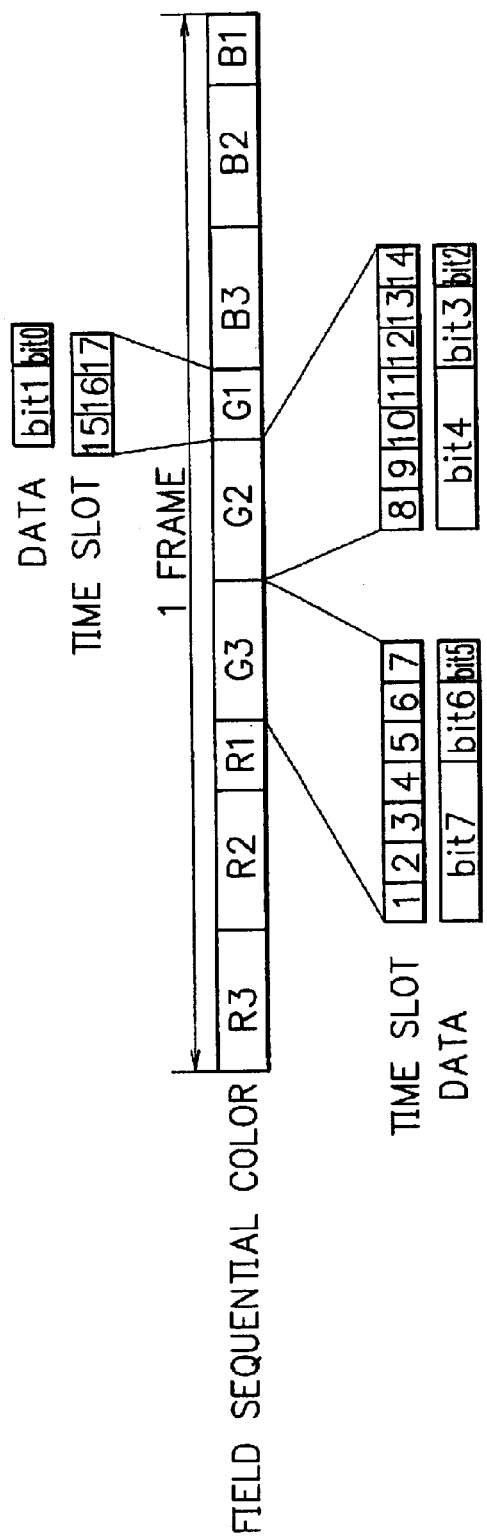
FIG. 9 is a schematic diagram showing the frame structure of an image signal input to the display system depicted in FIG. 6.

FIG. 9 is a schematic diagram showing the frame structure of the image signal 101 when the intensity filters have an area ratio of 3:7:7. In FIG. 9, G1, G2 and G3 indicate the color filter G of the color wheel 41 and the intensity filters F1, F2 and F3 of the intensity wheel 42, respectively. Similarly, R1, R2 and R3 indicate the color filter R and the respective intensity filters F1, F2 and F3, and B1, B2 and B3 indicate the color filter B and the respective intensity filters F1, F2 and F3.

Figure 4:
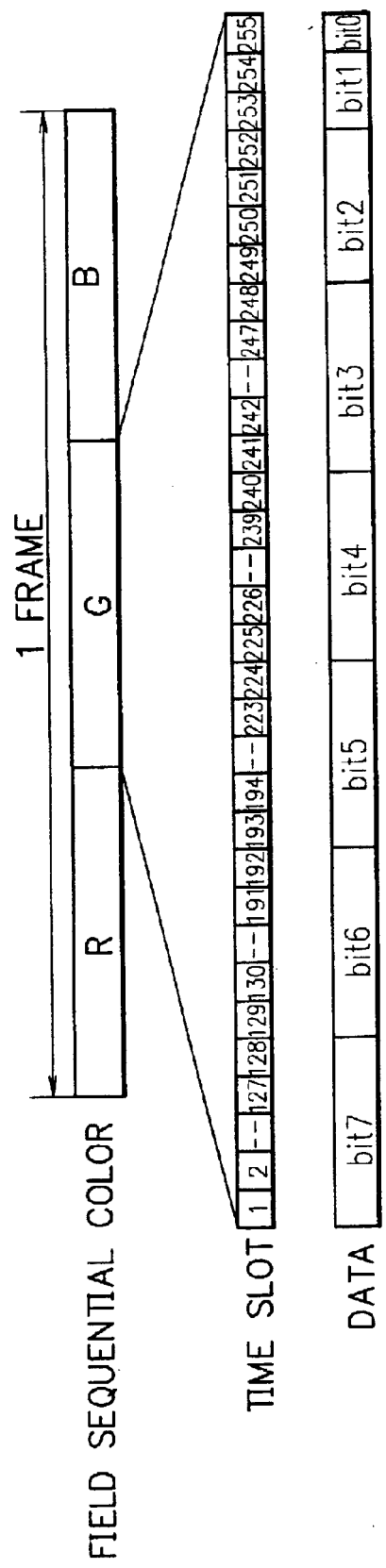
FIG. 4 is a schematic diagram showing the frame structure of an image signal input to the display system depicted in FIG. 1.

With the frame of FIG. 9, the minimum unit time in the pulse-width modulation is 1 frame time/3/(7+7+3). On the other hand, in the case of the conventional display system having no intensity switch filter unit shown in FIG. 1, it is assumed that n=1. Thus, the minimum unit time in the pulse-width modulation is 1 frame time/3/255 as illustrated in FIG. 4. From this it is to be understood that in the display system according to the embodiment of the present invention, the minimum unit time in the pulse-width modulation is dramatically prolonged as compared to the conventional display system, thereby enabling the use of the spatial light modulator with low response speed.

Additionally, as it is required to send data corresponding to the number of pixels within the span of the minimum unit time for sending modulated data to the spatial light modulator, it takes 1 frame time/3/255/the number of pixels to transfer data per pixel in the conventional display system. On the other hand, the display system according to the embodiment of the present invention allows 1 frame time/3/(7+7+3)/the number of pixels of data transfer time per frame. That is, time allocated for data transfer per frame is prolonged as compared to the conventional display system, and thereby the operation speed of electric circuits can be reduced. This contributes to reductions in electric power consumption, parts cost and circuit design cost as well as improvement in reliability, besides allowing margins in circuit design.

Incidentally, while the intensity switch filter unit 32 is disposed behind the color switch filter unit 31 in the display system depicted in FIG. 6, the unit 32 may be situated in front of the unit 31.

Colors switched by the color switch filter unit 31 are not limited to red, green and blue, and not necessarily three in number.

The color switch filter unit 31 shown in FIG. 6, the color switch timing information table 65 and color switch control circuit 68 shown in FIG. 8 are dispensable.

In addition, the present invention is applicable to three panel systems having three spatial light modulators.

Figure 10:
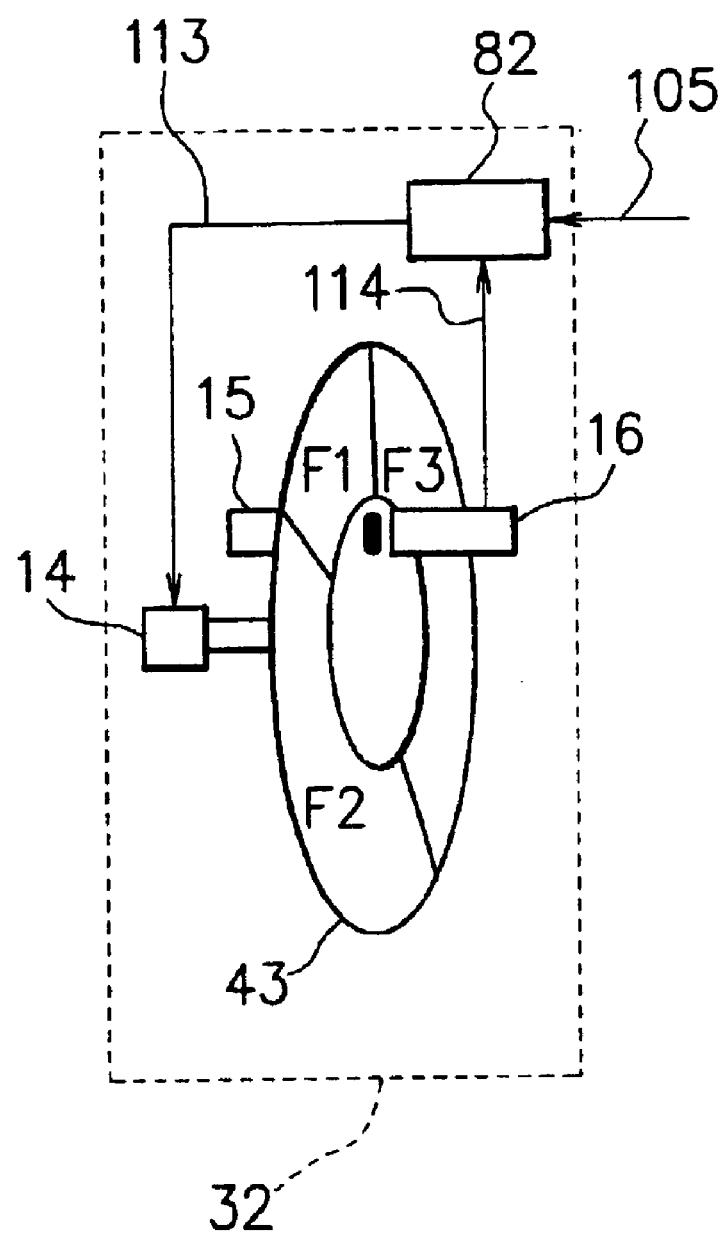
FIG. 10 is a schematic diagram of an intensity wheel used in the display system depicted in FIG. 6.

Besides, the display system in FIG. 6 may be provided with an intensity wheel like the one depicted in FIG. 10 instead of the intensity wheel 42. The intensity wheel 43 in FIG. 10 includes three intensity filters F1, F2 and F3 which are arranged in the circumferential direction at a prescribed rate. The intensity filters are in the same ratio shown by the intensity filters F1, F2 and F3 of the intensity wheel 42. In this case, the rotational speed of the intensity wheel 43 is set at triple the rotational speed of the color wheel 41. With this, the intensity wheel 43 makes one complete rotation with respect to each color filter of the color wheel 41, thereby achieving the same effect as described previously.

The ColorQuad™ architecture presented by M. G. Robinson et al. in "High Contrast Color Splitting Architecture Using Color Polarization Filters" SID '00 Digest, Vol. 31, p.92 (April 2000) may be adopted as the color switch filter unit 31 in FIG. 6. In this case, the color switch control signal 104 is used for controlling the color switch operation.

A twisted nematic liquid crystal panel may be employed as the intensity switch filter unit 32 in FIG. 6. In this case, the intensity switch control signal 105 is used for controlling the transmittance of the twisted nematic liquid crystal panel.

Further, the intensity wheel 42 in FIG. 6 is not limited to the one comprised of intensity filters covering the whole visible light range. It is possible to use, for example, filters that are capable of intensity switch regarding the wavelength band of the light output from the color switch filter unit 31.

The intensity levels may be switched at the light source instead of using the intensity switch filter unit 32. That is, the display system shown in FIG. 6 may have a configuration without the intensity switch filter unit 32 in which the intensity switch control signal 105 is input to the control circuit of the light source 1 so that the control circuit carries out the intensity switch operation.

The intensity levels may also be switched by using a stop-down feature well known for cameras. For example, it is possible to omit the intensity switch filter unit 32 from the display system shown in FIG. 6 and provide the system with the stop-down feature for changing the aperture of the projection lens 3 instead. In this case, the intensity switch control signal 105 is input to the control circuit of the stop-down feature for adjusting the aperture of the projection lens 3 so that the control circuit carries out the intensity switch operation.

The colors may be switched by using plural light sources emitting lights in different colors instead of using the color switch filter unit 32. That is, the display system shown in FIG. 6 may be provided with the light sources emitting lights in different colors instead of the light source 1 as substitute for the color switch filter unit 32. In this case, the light sources are switched according to the color switch control signal 104.

Further, the numbers of the intensity levels may be different for the respective colors. That is, while there are provided three intensity filters F1, F2 and F3 for each of the color filters R, G and B of the color wheel 41 in the display system shown in FIG. 6, different numbers of the intensity filters may be provided for the respective colors.

As set forth hereinbefore, in accordance with the present invention, it is possible to reduce the processes of manufacturing the wheel as compared to the case of producing the conventional display system. Thus, display systems can be provided at low cost.

Moreover, it is possible to dispense with the intensity wheel and the color wheel, since the intensity levels may be switched at the liquid crystal panel or the light source, or by adjusting the aperture of the projection lens, and besides the colors may be switched by using plural light sources emitting lights in different colors. This facilitates control operation and reduces costs.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A display system comprising:
   a color switch means for switching lights of plural color elements to provide the respective lights of color elements one by one in sequence;
   a spatial light modulation means which is illuminated by the lights of plural color elements from the color switch means and generates image lights of the respective color elements; and
   an intensity switch means for switching two or more intensity levels of the respective lights of plural color elements or the respective image lights of the color elements, the intensity switch means being separate from the color switch means and located in the display system to selectively alter light levels received from the plural color elements of the color switch means and operable independently of any white light source.

2. A display system comprising:
   a color switch means for switching lights of plural color elements to provide the respective lights of color elements one by one in sequence;
   a spatial light modulation means which is illuminated by the lights of plural color elements from the color switch means and generates image lights of the respective color elements; and
   an intensity switch means for switching two or more intensity levels of the respective lights of plural color elements or the respective image lights of the color elements, being separate from the color switch means wherein:

the color switch means includes a color wheel provided with a plurality of color filters having different spectral characteristics, which are arranged one by one in the circumferential direction at a prescribed rate;

the intensity switch means includes a intensity wheel provided with a plurality of intensity filters of different photo transmittances, which are arranged one by one in the circumferential direction at a prescribed rate;

the color wheel and the intensity wheel are arranged opposite to each other;

sequential color separation of white light from a light source is performed by using the color filters; and intensity levels are switched by using the intensity filters.

3. A display system comprising:

a color switch means for switching lights of plural color elements to provide the respective lights of color elements one by one in sequence;

a spatial light modulation means which is illuminated by the lights of plural color elements from the color switch means and generates image lights of the respective color elements; and an intensity switch means for switching two or more intensity levels of the respective lights of plural color elements or the respective image lights of the color elements, being separate from the color switch means, wherein:

the color switch means includes a color wheel provided with a plurality of color filters having different spectral characteristics, which are arranged one by one in the circumferential direction at a prescribed rate;

the intensity switch means includes a intensity wheel provided with a plurality of intensity filters of different photo transmittances, which are arranged one by one in the circumferential direction at a prescribed rate;

the intensity wheel is arranged opposite to the color wheel on the side thereof where white light from a light source enters;

sequential color separation of the white light from the light source is performed by using the color filters; and intensity levels are switched by using the intensity filters.

4. A display system comprising:

a color switch means for switching lights of plural color elements to provide the respective lights of color elements one by one in sequence;

a spatial light modulation means which is illuminated by the lights of plural color elements from the color switch means and generates image lights of the respective color elements; and an intensity switch means for switching two or more intensity levels of the respective lights of plural color elements or the respective image lights of the color elements, being separate from the color switch means, wherein:

the color switch means includes a color wheel provided with a plurality of color filters having different spectral characteristics, which are arranged one by one in the circumferential direction at a prescribed rate;

the intensity switch means includes a intensity wheel provided with a plurality of intensity filters of different photo transmittances, which are arranged one by one in the circumferential direction at a prescribed rate;

the intensity wheel is arranged opposite to the color wheel on the side thereof where lights that have undergone sequential color separation exit;

the sequential color separation of white light from a light source is performed by using the color filters; and intensity levels are switched by using the intensity filters.

5. A display system comprising:

a color switch means for switching lights of plural color elements to provide the respective lights of color elements one by one in sequence;

a spatial light modulation means which is illuminated by the lights of plural color elements from the color switch means and generates image lights of the respective color elements; and an intensity switch means for switching two or more intensity levels of the respective lights of plural color elements or the respective image lights of the color elements, being separate from the color switch means, wherein:

the color switch means includes a color wheel provided with a plurality of color filters having different spectral characteristics, which are arranged one by one in the circumferential direction at a prescribed rate;

the intensity switch means includes a intensity wheel divided into plural segments corresponding to the color filters of the color wheel, each segment having a plurality of intensity filters of different transmittances arranged one by one in the circumferential direction at a prescribed rate;

the color wheel and the intensity wheel are arranged opposite to each other;

sequential color separation of white light from a light source is performed by using the color filters; and intensity levels are switched by using the intensity filters.

6. A display system comprising:

a color switch means for switching lights of plural color elements to provide the respective lights of color elements one by one in sequence;

a spatial light modulation means which is illuminated by the lights of plural color elements from the color switch means and generates image lights of the respective color elements; and an intensity switch means for switching two or more intensity levels of the respective lights of plural color elements or the respective image lights of the color elements, being separate from the color switch means, wherein:

the color switch means includes a color wheel provided with a plurality of color filters having different spectral characteristics, which are arranged one by one in the circumferential direction at a prescribed rate;

the intensity switch means includes a intensity wheel divided into plural segments corresponding to the color filters of the color wheel, each segment having a plurality of intensity filters of different transmittances arranged one by one in the circumferential direction at a prescribed rate;

the intensity wheel is arranged opposite to the color wheel on the side thereof where white light from a light source enters;

sequential color separation of the white light from the light source is performed by using the color filters; and intensity levels are switched by using the intensity filters.

7. A display system comprising:

a color switch means for switching lights of plural color elements to provide the respective lights of color elements one by one in sequence;

a spatial light modulation means which is illuminated by the lights of plural color elements from the color switch means and generates image lights of the respective color elements; and an intensity switch means for switching two or more intensity levels of the respective lights of plural color elements or the respective image lights of the color elements, being separate from the color switch means, wherein:

the color switch means includes a color wheel provided with a plurality of color filters having different spectral characteristics, which are arranged one by one in the circumferential direction at a prescribed rate;

the intensity switch means includes a intensity wheel divided into plural segments corresponding to the color filters of the color wheel, each segment having a plurality of intensity filters of different transmittances arranged one by one in the circumferential direction at a prescribed rate;

the intensity wheel is arranged opposite to the color wheel on the side thereof where lights that have undergone sequential color separation exit;

the sequential color separation of white light from a light source is performed by using the color filters; and intensity levels are switched by using the intensity filters.

8. A display system comprising:

a color switch means for switching lights of plural color elements to provide the respective lights of color elements one by one in sequence;

a spatial light modulation means which is illuminated by the lights of plural color elements from the color switch means and generates image lights of the respective color elements; and an intensity switch means for switching two or more intensity levels of the respective lights of plural color elements or the respective image lights of the color elements, being separate from the color switch means, wherein:

the color switch means includes a color wheel provided with a plurality of color filters having different spectral characteristics, which are arranged one by one in the circumferential direction at a prescribed rate;

the intensity switch means includes a intensity wheel divided into plural segments corresponding to the color filters of the color wheel, each segment having a plurality of intensity filters of different transmittances arranged one by one in the circumferential direction at a prescribed rate;

the segments differ from one to another in the number of the intensity filters;

the color wheel and the intensity wheel are arranged opposite to each other;

sequential color separation of white light from a light source is performed by using the color filters; and intensity levels are switched by using the intensity filters.

9. A display system comprising:

a color switch means for switching lights of plural color elements to provide the respective lights of color elements one by one in sequence;

a spatial light modulation means which is illuminated by the lights of plural color elements from the color switch means and generates image lights of the respective color elements; and an intensity switch means for switching two or more intensity levels of the respective lights of plural color elements or the respective image lights of the color elements, being separate from the color switch means, wherein:

the color switch means includes a color wheel provided with a plurality of color filters having different spectral characteristics, which are arranged one by one in the circumferential direction at a prescribed rate;

the intensity switch means includes a intensity wheel divided into plural segments corresponding to the color filters of the color wheel, each segment having a plurality of intensity filters of different transmittances arranged one by one in the circumferential direction at a prescribed rate;

the segments differ from one to another in the number of the intensity filters;

the intensity wheel is arranged opposite to the color wheel on the side thereof where white light from a light source enters;

sequential color separation of the white light from the light source is performed by using the color filters; and intensity levels are switched by using the intensity filters.

10. A display system comprising:

a color switch means for switching lights of plural color elements to provide the respective lights of color elements one by one in sequence;

a spatial light modulation means which is illuminated by the lights of plural color elements from the color switch means and generates image lights of the respective color elements; and an intensity switch means for switching two or more intensity levels of the respective lights of plural color elements or the respective image lights of the color elements, being separate from the color switch means, wherein:

the color switch means includes a color wheel provided with a plurality of color filters having different spectral characteristics, which are arranged one by one in the circumferential direction at a prescribed rate;

the intensity switch means includes a intensity wheel divided into plural segments corresponding to the color filters of the color wheel, each segment having a plurality of intensity filters of different transmittances arranged one by one in the circumferential direction at a prescribed rate;

the segments differ from one to another in the number of the intensity filters;

the intensity wheel is arranged opposite to the color wheel on the side thereof where lights that have undergone sequential color separation exit;

the sequential color separation of white light from a light source is performed by using the color filters; and intensity levels are switched by using the intensity filters.

11. A display system comprising:

a color switch means for switching lights of plural color elements to provide the respective lights of color elements one by one in sequence;

a spatial light modulation means which is illuminated by the lights of plural color elements from the color switch means and generates image lights of the respective color and an intensity switch means for switching two or more intensity levels of the respective lights of plural color elements or the respective image lights of the color elements, being separate from the color switch means, wherein:

the color switch means includes a color wheel provided with a plurality of color filters having different spectral characteristics, which are arranged one by one in the circumferential direction at a prescribed rate;

the intensity switch means includes a intensity wheel divided into plural segments corresponding to the color filters of the color wheel, each segment having a plurality of intensity filters of different transmittances arranged one by one in the circumferential direction at a prescribed rate;

the segments are provided with the same number of the intensity filters;

the color wheel and the intensity wheel are arranged opposite to each other;

sequential color separation of white light from a light source is performed by using the color filters; and intensity levels are switched by using the intensity filters.

12. A display system comprising:

a color switch means for switching lights of plural color elements to provide the respective lights of color elements one by one in sequence;

a spatial light modulation means which is illuminated by the lights of plural color elements from the color switch means and generates image lights of the respective color elements; and an intensity switch means for switching two or more intensity levels of the respective lights of plural color elements or the respective image lights of the color elements, being separate from the color switch means, wherein:

the color switch means includes a color wheel provided with a plurality of color filters having different spectral characteristics, which are arranged one by one in the circumferential direction at a prescribed rate;

the intensity switch means includes a intensity wheel divided into plural segments corresponding to the color filters of the color wheel, each segment having a plurality of intensity filters of different transmittances arranged one by one in the circumferential direction at a prescribed rate;

the segments are provided with the same number of the intensity filters;

the intensity wheel is arranged opposite to the color wheel on the side thereof where white light from a light source enters;

sequential color separation of the white light from the light source is performed by using the color filters; and intensity levels are switched by using the intensity filters.

13. A display system comprising:

a color switch means for switching lights of plural color elements to provide the respective lights of color elements one by one in sequence;

a spatial light modulation means which is illuminated by the lights of plural color elements from the color switch means and generates image lights of the respective color elements; and an intensity switch means for switching two or more intensity levels of the respective lights of plural color elements or the respective image lights of the color elements, being separate from the color switch means, wherein:

the color switch means includes a color wheel provided with a plurality of color filters having different spectral characteristics, which are arranged one by one in the circumferential direction at a prescribed rate;

the intensity switch means includes a intensity wheel divided into plural segments corresponding to the color filters of the color wheel, each segment having a plurality of intensity filters of different transmittances arranged one by one in the circumferential direction at a prescribed rate;

the segments are provided with the same number of the intensity filters;

the intensity wheel is arranged opposite to the color wheel on the side thereof where lights that have undergone sequential color separation exit;

the sequential color separation of white light from a light source is performed by using the color filters; and intensity levels are switched by using the intensity filters.

14. The display system claimed in claim 1, wherein the intensity switch means includes a liquid crystal panel capable of transmittance switching.

15. The display system claimed in claim 1, wherein the color switch means performs sequential color separation of white light from a Light source, and the intensity switch means switches the intensity levels of the light source.

16. The display system claimed in claim 1, wherein the intensity switch means changes the aperture of a projection lens for projecting the image lights of the respective color elements generated by the spatial light modulation means.

17. A display system comprising:

a color switcher that receives white light from a light source and selectively and sequentially filters the white light from the light source by the passage thereof through a plurality of color filter elements;

a spacial light modulator which is interposed to be illuminated by light received from the color switcher to generate image light that can be displayed in color; and a light intensity controller that controls the light which emanates from the spacial light modulator by controlling intensity levels of the light received by the spacial light modulator without modulating the intensity level of the white light emitted from the light source.

18. The display system of claim 17 wherein the color switcher includes a color wheel with a plurality of color filters having different spectral characteristics, which are arranged one by one in the circumferential direction at the prescribed rate;

the light intensity controller includes a intensity wheel provided with a plurality of intensity filters of different photo transmittances, which are arranged one by one in the circumferential direction at a prescribed rate;

the color wheel and the intensity wheel are arranged opposite to each other;

sequential color separation of white light from a light source is performed by using the color filters; and intensity levels are switched by using the intensity filters.

19. The display system claimed in claim 17, wherein:

the color switcher includes a color wheel provided with a plurality of color filters having different spectral characteristics, which are arranged one by one in the circumferential direction at a prescribed rate;

the light intensity controller includes a intensity wheel provided with a plurality of intensity filters of different photo transmittances, which are arranged one by one in the circumferential direction at a prescribed rate;

the intensity wheel is arranged opposite to the color wheel on the side thereof where white light from a light source enters;

sequential color separation of the white light from the light source is performed by using the color filters; and intensity levels are switched by using the intensity filters.

20. The display system claimed in claim 17, wherein:
the color switcher includes a color wheel provided with a plurality of color filters having different spectral characteristics, which are arranged one by one in the circumferential direction at a prescribed rate;
the light intensity controller includes a intensity wheel provided with a plurality of intensity filters of different photo transmittances, which are arranged one by one in the circumferential direction at a prescribed rate;
the intensity wheel is arranged opposite to the color wheel on the side thereof where lights that have undergone sequential color separation exit;
the sequential color separation of white light from a light source is performed by using the color filters; and
intensity levels are switched by using the intensity filters.

21. The display system claimed in claim 17, wherein:
the color switcher includes a color wheel provided with a plurality of color filters having different spectral characteristics, which are arranged one by one in the circumferential direction at a prescribed rate;
the light intensity controller includes a intensity wheel divided into plural segments corresponding to the color filters of the color wheel, each segment having a plurality of intensity filters of different transmittances arranged one by one in the circumferential direction at a prescribed rate;
the color wheel and the intensity wheel are arranged opposite to each other;
sequential color separation of white light from a light source is performed by using the color filters; and
intensity levels are switched by using the intensity filters.

22. The display system claimed in claim 17, wherein:
the color switcher includes a color wheel provided with a plurality of color filters having different spectral characteristics, which are arranged one by one in the circumferential direction at a prescribed rate;
the light intensity controller includes a intensity wheel divided into plural segments corresponding to the color filters of the color wheel, each segment having a plurality of intensity filters of different transmittances arranged one by one in the circumferential direction at a prescribed rate;
the intensity wheel is arranged opposite to the color wheel on the side thereof where white light from a light source enters;
sequential color separation of the white light from the light source is performed by using the color filters; and
intensity levels are switched by using the intensity filters.

23. The display system claimed in claim 17, wherein:
the color switcher includes a color wheel provided with a plurality of color filters having different spectral characteristics, which are arranged one by one in the circumferential direction at a prescribed rate;
the light intensity controller includes a intensity wheel divided into plural segments corresponding to the color filters of the color wheel, each segment having a plurality of intensity filters of different transmittances arranged one by one in the circumferential direction at a prescribed rate;
the intensity wheel is arranged opposite to the color wheel on the side thereof where lights that have undergone sequential color separation exit;
the sequential color separation of white light from a light source is performed by using the color filters; and
intensity levels are switched by using the intensity filters.

24. The display system claimed in claim 17, wherein:
the color switcher includes a color wheel provided with a plurality of color filters having different spectral characteristics, which are arranged one by one in the circumferential direction at a prescribed rate;
the light intensity controller includes a intensity wheel divided into plural segments corresponding to the color filters of the color wheel, each segment having a plurality of intensity filters of different transmittances arranged one by one in the circumferential direction at a prescribed rate;
the segments differ from one to another in the number of the intensity filters;
the color wheel and the intensity wheel are arranged opposite to each other;
sequential color separation of white light from a light source is performed by using the color filters; and
intensity levels are switched by using the intensity filters.

25. The display system claimed in claim 17, wherein:
the color switcher includes a color wheel provided with a plurality of color filters having different spectral characteristics, which are arranged one by one in the circumferential direction at a prescribed rate;
the light intensity controller includes a intensity wheel divided into plural segments corresponding to the color filters of the color wheel, each segment having a plurality of intensity filters of different transmittances arranged one by one in the circumferential direction at a prescribed rate;
the segments differ from one to another in the number of the intensity filters;
the intensity wheel is arranged opposite to the color wheel on the side thereof where white light from a light source enters;
sequential color separation of the white light from the light source is performed by using the color filters; and
intensity levels are switched by using the intensity filters.

26. The display system claimed in claim 17, wherein:
the color switcher includes a color wheel provided with a plurality of color filters having different spectral characteristics, which are arranged one by one in the circumferential direction at a prescribed rate;
the light intensity controller includes a intensity wheel divided into plural segments corresponding to the color filters of the color wheel, each segment having a plurality of intensity filters of different transmittances arranged one by one in the circumferential direction at a prescribed rate;
the segments differ from one to another in the number of the intensity filters;
the intensity wheel is arranged opposite to the color wheel on the side thereof where lights that have undergone sequential color separation exit;
the sequential color separation of white light from a light source is performed by using the color filters; and
intensity levels are switched by using the intensity filters.

27. The display system claimed in claim 17, wherein:
the color switcher includes a color wheel provided with a plurality of color filters having different spectral characteristics, which are arranged one by one in the circumferential direction at a prescribed rate;
the light intensity controller includes a intensity wheel divided into plural segments corresponding to the color filters of the color wheel, each segment having a plurality of intensity filters of different transmittances arranged one by one in the circumferential direction at a prescribed rate;

the segments are provided with the same number of the intensity filters;

the color wheel and the intensity wheel are arranged opposite to each other;

sequential color separation of white light from a light source is performed by using the color filters; and intensity levels are switched by using the intensity filters.

28. The display system claimed in claim 17, wherein:

the color switcher includes a color wheel provided with a plurality of color filters having different spectral characteristics, which are arranged one by one in the circumferential direction at a prescribed rate;

the light intensity controller includes a intensity wheel divided into plural segments corresponding to the color filters of the color wheel, each segment having a plurality of intensity filters of different transmittances arranged one by one in the circumferential direction at a prescribed rate;

the segments are provided with the same number of the intensity filters;

the intensity wheel is arranged opposite to the color wheel on the side thereof where white light from a light source enters;

sequential color separation of the white light from the light source is performed by using the color filters; and intensity levels are switched by using the intensity filters.

29. The display system claimed in claim 17, wherein:

the color switcher includes a color wheel provided with a plurality of color filters having different spectral characteristics, which are arranged one by one in the circumferential direction at a prescribed rate;

the light intensity controller includes a intensity wheel divided into plural segments corresponding to the color filters of the color wheel, each segment having a plurality of intensity filters of different transmittances arranged one by one in the circumferential direction at a prescribed rate;

the segments are provided with the same number of the intensity filters;

the intensity wheel is arranged opposite to the color wheel on the side thereof where lights that have undergone sequential color separation exit;

the sequential color separation of white light from a light source is performed by using the color filters; and intensity levels are switched by using the intensity filters.

* * * * *